Patented Apr. 3, 1923.

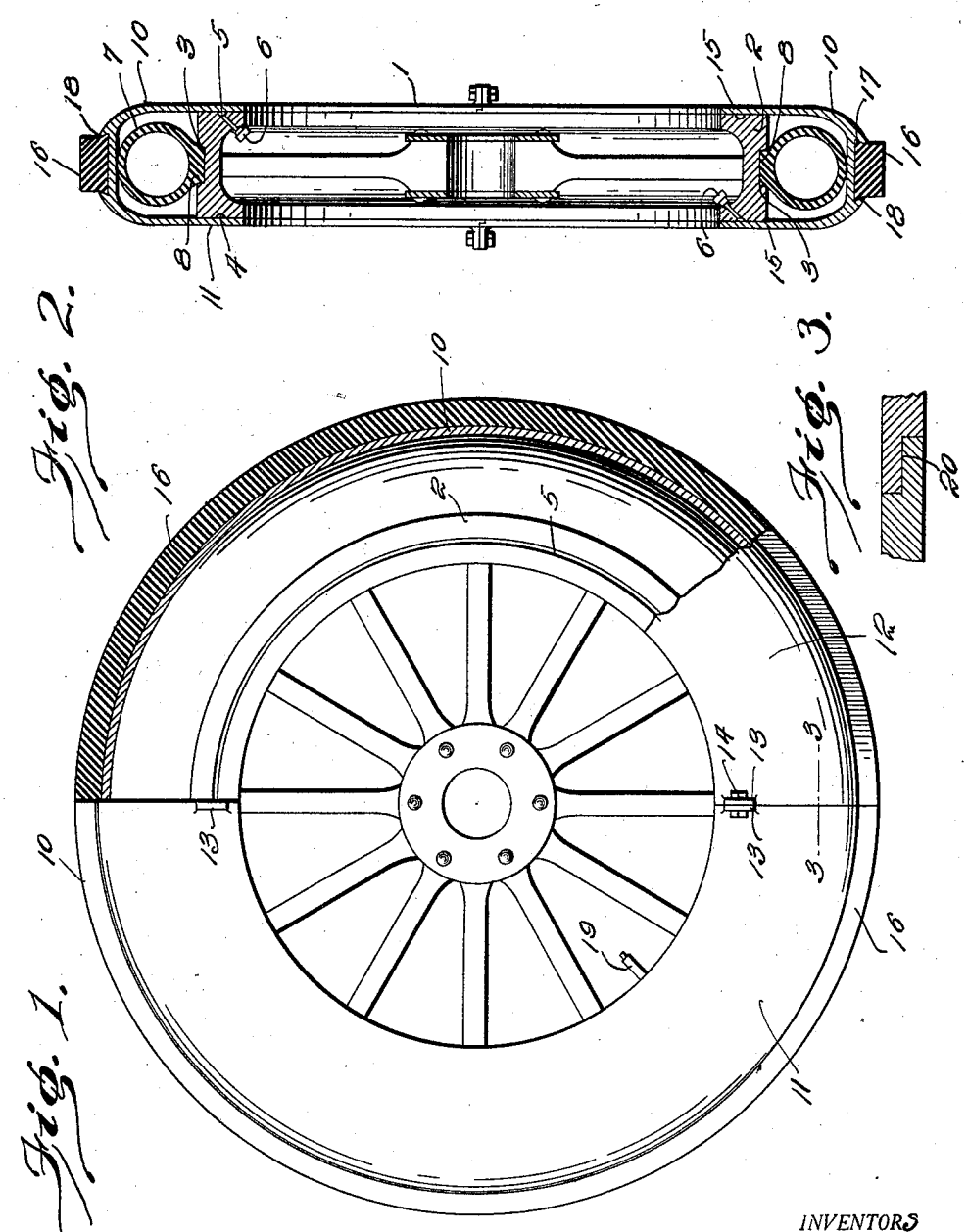

1,450,740

UNITED STATES PATENT OFFICE.

MILTON J. HELMICK AND THOMAS L. AGNEW, OF ALBUQUERQUE, NEW MEXICO.

RESILIENT WHEEL.

Application filed October 22, 1920. Serial No. 418,687.

*To all whom it may concern:*

Be it known that we, MILTON J. HELMICK and THOMAS L. AGNEW, citizens of the United States, residing at Albuquerque, in the county of Bernalillo and State of New Mexico, have invented certain new and useful Improvements in a Resilient Wheel, of which the following is a specification.

This invention relates to resilient vehicle wheels of the cushion tire type.

The object of the invention is to provide a wheel of this character which while having all of the advantages of a pneumatic tire has none of its disadvantages, being puncture and blow-out proof, its life being long and the cost of maintenance small.

Another object is to provide a wheel of this character which requires no attention except to keep the cushioning tube inflated and the rim oiled.

Another object is to provide such a wheel which travels in a cushioning casing and yet is allowed perfect freedom of motion in any direction within its plane without any lateral motion within the casing, therefore rendering it as resilient to shocks as if it traveled directly on the ground; which has no lost motion when turned for steering; and in which there is no lateral strain on the pneumatic tube since the strain is applied directly to the rim and casing the tube turning with them.

Another object is to construct such a wheel without employing any springs, small parts or complex contrivances and which will present an attractive and neat appearance, there being no break in the circular lines or flat surfaces presented to view.

With these and other objects in view, the invention consists in certain novel features of construction as hereinafter shown and described and specifically pointed out in the claims.

In the accompanying drawing:

Figure 1 represents a side elevation with parts broken out and in section of a wheel constructed in accordance with this invention.

Fig. 2 is a central vertical section thereof.

Fig. 3 is a detail sectional view taken on the line 3—3 of Fig. 1.

In the embodiment illustrated a wheel 1 is shown of the disk or spoke type provided with a wide steel rim felly 2 having in the periphery thereof midway its width an annular seat 3. The opposed faces of this rim 2 are equipped with continuous annular oil grooves 4 and 5 which are fed by oilers 6 placed at intervals along the rim on both sides thereof. This rim 2 is constructed of steel and the edges are highly polished for a purpose presently to be described, the width of its periphery being greater than the diameter of an inflatable pneumatic tube 7 which is mounted thereon and which has a rib on its inner perimeter to fit in the seat 3 of the rim. This rib 8 is shaped to fit the seat 3 whereby the tube is retained and carried by the wheel.

An outer steel casing 10 circular in form and inverted U-shaped in cross section is arranged around the rim felly 2 being constructed of high grade steel with its side members polished on their inner faces and slidably engaged with the polished faces of the rim so that friction between these parts is reduced to a minimum and the oil supplied to the grooves 4 and 5 further reduces this friction. The casing 10 is preferably constructed in two parts 11 and 12 to provide for its easy removal and replacement and as shown they are formed by bisecting the casing through its diameter, the meeting edges of the sections 11 and 12 being provided on their outer faces with apertured registering ears 13 to receive clamping bolts 14 for securing them together after the casing has been placed in operative position on the wheel. As shown the side members or flanges 15 of the casing overlap the outer faces of the rim 2 with their edges terminating flush with the inner perimeter of the rim. The inside circumference of the casing 10 is of such size that when the tube 7 is inflated therein the outer perimeter thereof will bear against the inner face of the perimeter of the casing throughout its entire circumference.

The casing 10 has mounted on its perimeter or tread portion a solid rubber or rubber and fabric tread member 16 which is fitted around the outside of the casing in a shallow groove or seat 18, said tread member being provided along its inner side edges with beads 17 which fit in the undercut side walls of the groove 18.

From the above description it will be obvious that the wheel 1 while permitted freedom of motion within its plane has no lateral motion within the casing and the contact of the oiled highly polished surfaces on the inner faces of the casing flanges and the outer side faces of the rim 2 renders the movement of the wheel within the casing frictionless.

The freedom of motion of the wheel within the casing renders it resilient to shocks and since the rim 3 thereof at every point is closely confined by the flanges 15 of the casing 10 there is no lost motion when the wheel is turned from side to side in steering or turning and when the wheel is so turned the outer casing is turned with it without difficulty. Moreover there is no lateral strain on the pneumatic tube 7 incident to such turning since the strain is applied directly to the rim and casing and the tube 7 turns with them.

It will also be obvious that the casing 10 being constructed of high grade steel will endure indefinitely and avoid all possibility of punctures and blow-outs in the tube 7. The only parts which will require replacement are the tube 7 and the tread 16 the cost of both of which is small. The casing 10 being made in sections may be easily removed and replaced when it is desired to change the tube 7 and the edges of these two sections where they meet are mortised as shown at 20 in Fig. 3 to ensure a tight fit and a smooth inner surface.

It is of course understood that an inflation valve is to be provided for the tube 7 and such a valve is shown at 19 in Fig. 1.

The preferred embodiment of the invention is disclosed in the drawings and set forth in the specification, but it will be understood that any modifications within the scope of the claimed invention may be made in the construction without departing from the principle of the invention or sacrificing any of its advantages.

What is claimed is:

1. A resilient vehicle wheel comprising a felly having a centrally disposed and circumferentially extending continuous groove in the outer face thereof providing a seat, an annular pneumatic cushioning element formed with a continuous rim fitted throughout in said seat, the transverse diameter of said element being substantially less than the width of said felly, a metallic rim substantially U-shape in cross section and engaged over said felly and element and having the inner face of the tread portion thereof normally and centrally in contact with said element, the sides of said rim disposed in sliding contact with the sides of said felly, said rim having a thickened tread portion and the outer face thereof provided with a continuous circumferentially extending groove of greater width than the groove in the rim, and an annular resilient tread member fitted in throughout and projecting from the groove in the tread portion of the rim.

2. A resilient vehicle wheel comprising a felly having a centrally disposed and circumferentially extending continuous groove in the outer face thereof providing a seat, an annular pneumatic cushioning element formed with a continuous rim fitted throughout in said seat, the transverse diameter of said element being substantially less than the width of said felly, a metallic rim substantially U-shape in cross section and engaged over said felly and element and having the inner face of the tread portion thereof normally and centrally in contact with said element, the sides of said rim disposed in sliding contact with the sides of said felly, said rim having a thickened tread portion and the outer face thereof provided with a continuous circumferentially extending groove of greater width than the groove in the rim, and an annular resilient tread member fitted in throughout and projecting from the groove in the tread portion of the rim, and the side walls of the groove in the rim being undercut.

In testimony whereof, we affix our signatures hereto.

MILTON J. HELMICK.
THOMAS L. AGNEW.